United States Patent

[11] 3,539,145

[72] Inventor James Frank Maxwell
3507 Lakewood Drive, Norfolk, Virginia 23509
[21] Appl. No. 709,289
[22] Filed Feb. 29, 1968
[45] Patented Nov. 10, 1970

[54] ICE TRAY
1 Claim, 8 Drawing Figs.

[52] U.S. Cl. .................................................. 249/132,
249/127, 249/206
[51] Int. Cl. ....................................................... B28b 7/06;
F25c 1/24
[50] Field of Search .......................................... 249/132,
206, 111, 112, 117, 53, 129, 127, 128, 130;
220/97

[56] References Cited
UNITED STATES PATENTS

| | | | |
|---|---|---|---|
| 1,895,742 | 1/1933 | Whitehead .................... | 249/53X |
| 2,452,846 | 11/1948 | Flynn ............................ | 249/132X |
| 3,259,269 | 7/1966 | Asenbauer .................... | 220/97 |
| 3,443,785 | 5/1969 | Ewers ........................... | 249/129 |
| 2,593,106 | 4/1952 | Copeman ...................... | 249/128 |

Primary Examiner—J. Spencer Overholser
Assistant Examiner—Ben D. Tobor
Attorney—Roylance, Abrams, Kruger, Berdo and Kaul ABSTRACT: An ice tray having a bottom and four sides, one of which extends upwardly only to the desired liquid level. The tray can be tilted toward the higher end for spill-free transport from the filling point to the freezing location. In another embodiment a slip-on attachment for conventional trays is provided, the attachment providing height extensions for three walls to yield the same spillproof structure.

Patented Nov. 10, 1970
3,539,145
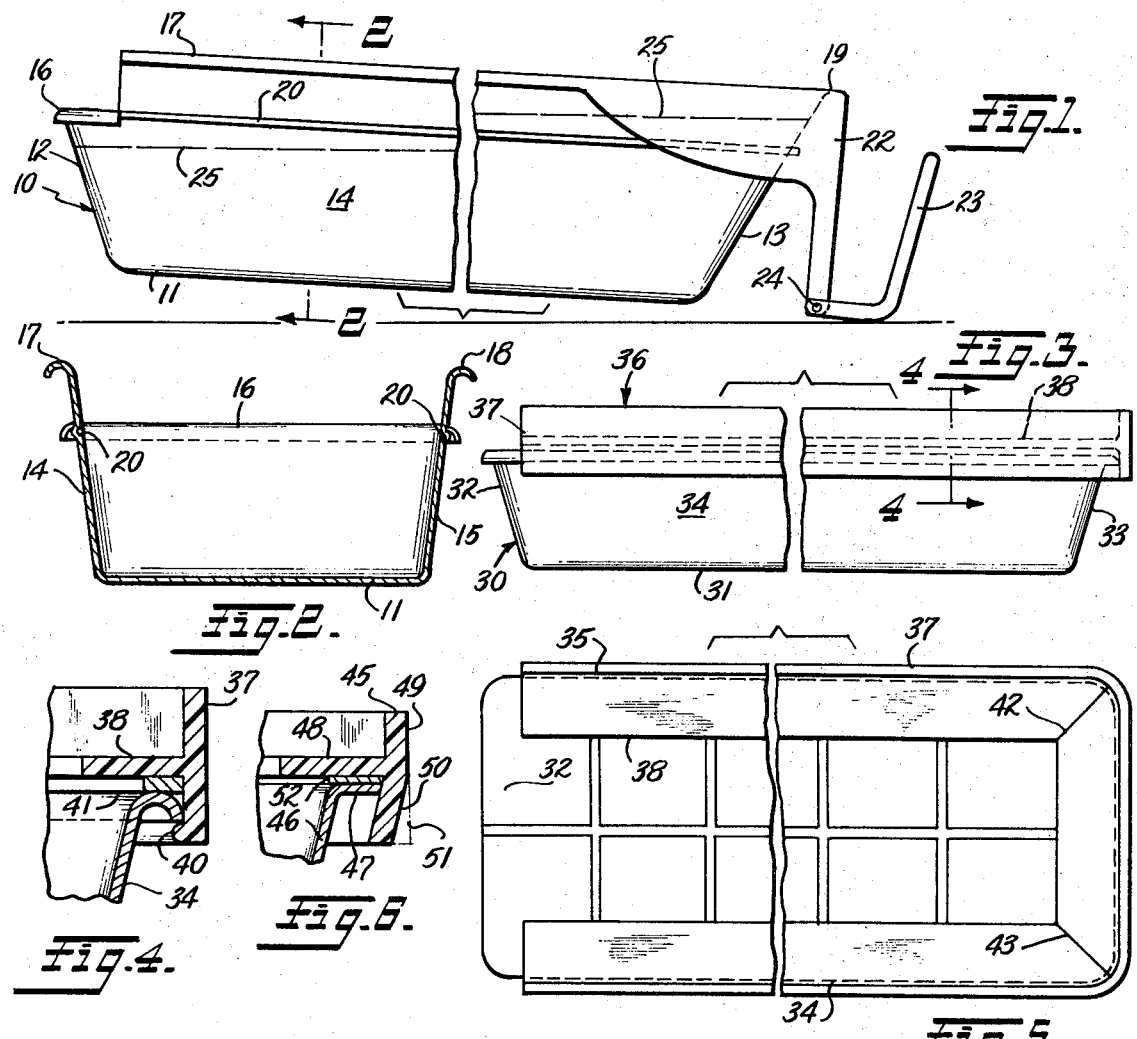
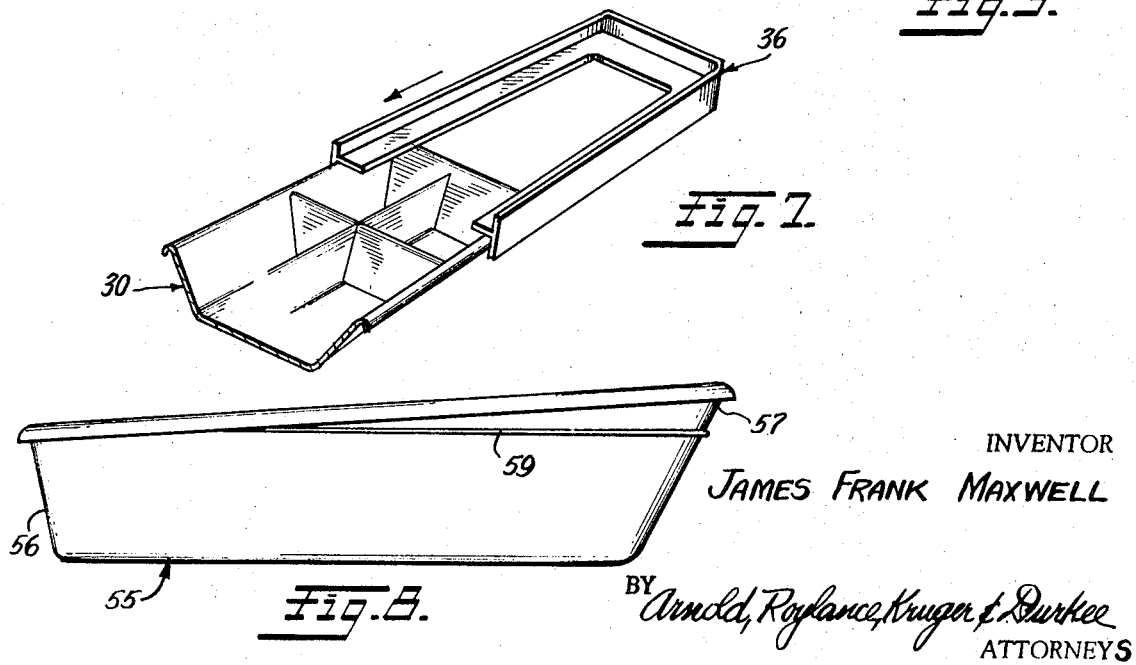
INVENTOR
JAMES FRANK MAXWELL
BY Arnold, Roylance, Kruger & Durkee
ATTORNEYS

ICE TRAY

This invention relates to a molding device for producing a plurality of frozen products in the nature of ice chunks or "cubes" and, more specifically, to an improved tray for producing frozen products.

Several problems have arisen over the years in the design and use of ice trays in the home. Most of these problems have been overcome by providing means for separating the tray from a freezing compartment of a refrigerator; providing mechanical devices and/or coatings to facilitate removal of the product from the tray; and designing dividers for the tray so that the product is furnished in a desired shape. It will be recognized that these problems and solutions, including that of the present invention, apply to ice "cubes", so-called whether cubical or not, and also to frozen confections and the like.

One problem which has not been suitably solved is the problem of filling the tray to a desired level with a liquid and then transporting the filled tray from a sink to a freezing compartment without spilling some of the liquid.

An object of the present invention is to provide an ice tray having side walls formed to prevent spillage.

Another object is to provide an attachment for a conventional ice tray which forms side wall extensions to prevent spillage.

The invention includes a tray of the type designed to hold a divider assembly for forming ice "cubes", which tray has four upwardly extending walls, three of which are of equal height to each other. The fourth wall is shorter and defines a preselected liquid level to which the tray can be filled. After filling, the tray can be tilted to allow the liquid to flow away from the top of the short wall for transit to a freezing chamber. The three higher walls can be integrally formed on the tray or can be provided separately for attachment to a conventional tray.

In order that the manner in which these and other objects are attained can be understood in detail, specific embodiments thereof will be described with reference to the following drawings, which form a part of this specification, and wherein:

FIG. 1 is a side elevation of one embodiment of the invention having integrally formed walls;

FIG. 2 is a section of the embodiment of FIG. 1 taken on the line 2-2;

FIG. 3 is a side elevation of a second embodiment of the invention in which the side wall extensions are separately provided;

FIG. 4 is a section of a portion of the embodiment of FIG. 3 taken on the lines 4-4;

FIG. 5 is a plan view of the embodiment of FIG. 3;

FIG. 6 is a section similar to FIG. 4 showing a further embodiment of the side wall attachment;

FIG. 7 is a perspective of the embodiment of FIG. 5, in partial section, showing the assembly method; and FIG. 8 is a side elevation of a third embodiment of the invention.

FIGS. 1 and 2 show one embodiment of the invention which includes a tray indicated generally at 10 having a rectangular bottom wall 11, upwardly and outwardly extending end walls 12 and 13, and side walls 14 and 15. The upper edge of end wall 12 is rolled to present a smooth rounded edge. The side walls and end walls are preferably integrally formed and joined together at the corners to provide a continuous watertight tray. The rolled upper edge of end wall 12 extends around the corners formed by the junctions with side walls 14 and 15.

Side walls 14 and 15 continue upwardly beyond the upper limit of end wall 12 by a significant distance, amounting to approximately 25 percent of the height of the end wall. The upper edges of side walls 14 and 15 are similarly rolled at 17 and 18. End wall 13 extends upwardly beyond the upper limit of wall 12 to a height equal to the side walls, end wall 13 also being rolled at 19 so that a single continuous smooth upper edge is formed at the upper limits of walls 13, 14 and 15. An elongated dimple or groove 20 is formed in side walls 14 and 15 and end wall 13 at the level of the upper limit 16 of end wall 12, groove 20 being in a plane parallel with bottom wall 11 for the purpose of indicating a desired liquid level in the tray.

The material used to form the roll at the upper edges of end wall 13 and those portions of side walls 14 and 15 near that end wall can be used to form a downwardly extending portion 22 to which a lever 23 can be pivotally attached as at 24, near the lower limit of extension 22. Lever 23 can then be used to disengage the tray from a supporting surface if frozen liquid forms a bond between the tray and the surface. The lever is well known in the art and forms no part of the present invention.

The tray shown in FIGS. 1 and 2 is adapted to be provided with conventional dividers of any known design, not shown in FIGS. 1 and 2, for the purpose of forming individual segments of a frozen product or of other material being molded in the tray.

It will be seen from the above description that the tray includes three walls which extend substantially above the fourth wall, thus providing an automatic establishment of liquid level within the tray. In the filling process, the tray can be rested on a horizontal surface such as the floor of a sink. The tray can then be filled, allowing the liquid to spill over the upper limit 16 of end wall 12. The tray can then be tilted as shown in FIG. 1, lifting the end including wall 12 above the end including wall 13. The tilt allows the liquid to flow toward the lower end, establishing a level line indicated at 25. Because of the height of wall 13 being greater than that of wall 12, the liquid will not be spilled and the tray can be neatly and easily transported to the freezing compartment of a refrigerator or the like in which the tray can then be installed, allowing the tray to again become horizontal, after which the liquid is chilled and solidified in the usual manner.

Although the tray can be constructed as described above to have three integrally formed walls which extend upwardly beyond the fourth wall, it will be recognized that trays presently in use can advantageously be fitted with an accessory providing similar convenience. An embodiment of the invention illustrating this concept is shown in FIGS. 3—7 in which the tray, indicated generally at 30, includes a bottom wall 31, end walls 32 and 33 and side walls 34 and 35. Walls 32—35 extend upwardly and outwardly from the periphery of rectangular bottom wall 31 and terminate, all at the same level in a plane parallel to bottom wall 31, in rolled edges forming a single upper limit for liquid contained within the tray. Using the tray alone, it will be obvious that the tray can only be partially filled or that some liquid is likely to be spilled during the trip between the sink and the refrigerator in the average location of use.

To prevent such spillage and to render the tray useful in a manner similar to the embodiment shown in FIG. 1, the tray is provided with an adaptor indicated generally at 36 which includes a vertical wall portion 37 which is formed in the shape of a U, the inner span of the U being equal to or slightly greater than the outer limits of the upper rolled edges of side walls 34 and 35. The length of the U is slightly less than the length of the upper edge of each side wall, thus forming a member which can be placed around the upper portion of the tray, forming side wall extensions which protrude upwardly beyond the walls. To maintain the side wall 37 in position, the adaptor is provided with a continuous inwardly extending rib 38 which is integrally formed with wall 37 and which extends inwardly over the upper edges of side walls 34 and 35 and end wall 33. The lower inner surface of wall 37 is provided with an inwardly extending ridge 40 which can be continuous or can be a plurality of inwardly extending protrusions, spaced from rib 38 a sufficient distance to grip the lower edge of the rolled portions of the side and end walls, gripping the rolled edge and maintaining rib 38 flush against the upper limit of the side and end walls which it encloses. As shown in FIG. 4, the adaptor can also be provided with a gasket 41 of a softer material than adaptor 36. Gasket 41 is then compressed between the upper surface of the rolled edge of the tray walls and the lower surface of rib 38, forming a liquid-tight seal. Adaptor 36 can be constructed of a metal or a plastic such as, for example, polyethylene.

For manufacturing purposes, adaptor 36 can be produced by continuously extruding a length of material having a T cross section such as that shown in FIG. 4. The rib can then be cut and a triangular shaped notch portion of the rib material removed to allow the material to be folded into a U-shape, forming seams at points 42 and 43 in FIG. 5. These seam points can then be thermally or adhesively bonded or welded to form a continuous rib and to form a relatively rigid U-shaped structure suitable for application to a conventional tray. It will be recognized that this manufacturing technique will allow the continuous length of extruded material to be notched and folded in a variety of dimensions to fit varying sizes of trays presently available on the market.

A modification of the basic adaptor design is shown in FIG. 6 wherein the adaptor 45 is designed for use with a tray having a flat, rather than a rolled, upper edge. In FIG. 6, a side wall 46 of a tray terminates at its upper edges in a flat, outwardly extending flange 47. Adaptor 45 is formed with a rib 48 extending inwardly as previously described, a vertical wall portion 49 extending vertically upwardly from rib 48, and a downwardly and inwardly extending portion 50, the inner surface of which fits beneath the outer edge of flange 47 to provide the necessary gripping force provided in the embodiment of FIG. 4 by member 40. It will be recognized that the outer surface of the downwardly extending portion 50 need not slant inwardly but can present a vertical outer face as indicated by dotted lines 51. Adaptor 45 can also be provided with a gasket 52 to provide a fluid-tight seal between rib 48 and flange 47.

As shown in FIG. 7, the adaptor 36, or adaptor 45 shown in FIG. 6, can be installed on a conventional tray by pressing the rib at the open end of the adaptor firmly against the upper surface of the tray and by then sliding the adaptor lengthwise of the tray until the end portion of the adaptor firmly seats against the upper surface of the end wall.

It will be recognized that the adaptor need not remain on the tray after it has been placed in the freezing compartment. Because of its U-shape, it can be removed and used on another tray.

A further embodiment of the invention, similar in concept to that of FIG. 1, is shown in FIG. 8 wherein a tray indicated generally at 55 is provided with a short end wall 56, a taller end wall 57 and side walls which extend upwardly from the bottom and which terminate in a slanted upper edge, joining the upper limits of the end walls in a smooth slope. The upper edges of all walls terminate in the usual roll. As described with reference to FIG. 1, the upper extension of the taller end wall and the side walls allows the tray to be filled to the upper limit of the short end wall 56 and then tilted for transport to the freezing location. The tray can also be provided with the elongated dimple or groove 59 for a visual indication of desired liquid level.

While certain advantageous embodiments have been chosen to illustrate the invention, it will be understood by those skilled in the art that various changes and modifications can be made therein without departing from the scope of the invention as defined in the appended claims.

I claim:

1. A molding tray comprising a rectangular bottom wall; three side walls extending upwardly from three edges of said rectangular bottom wall, said three side walls terminating in upper edges which lie in a plane parallel to said bottom wall; a fourth side wall extending upwardly from the fourth edge of said rectangular bottom wall, said fourth edge being shorter than two of the other edges, said fourth wall terminating in an edge which lies between said plane and the plane containing said bottom wall; said side walls being joined along contiguous portions of their side edges to form an upwardly opening liquid-retaining tray in which the upper edge of said fourth wall defines a desired liquid level when said bottom wall is horizontal and said three side walls retain liquid when said tray is tilted; and wherein each of said three side walls comprises a first wall portion which extends upwardly and terminates in an upper edge which lies in a plane which contains the upper edge of said fourth side wall, and a second wall portion which extends upwardly from said upper edge of said first wall portion, the juncture of said first and second portions being liquid tight; and wherein the second wall portions are joined to form a continuous U-shaped member.